United States Patent
Hui

(10) Patent No.: US 7,878,832 B2
(45) Date of Patent: Feb. 1, 2011

(54) UNDERWATER CONNECTOR WITH A DEFORMABLE INSERTION MEMBER AND A SEALING MEMBER SQUEEZED BY A CLAMPING MEMBER

(75) Inventor: Wing-kin Hui, Hong Kong (HK)

(73) Assignee: Culture Bright Ltd, Hong Kong (HK)

( * ) Notice: Subject to any disclaimer, the term of this patent is extended or adjusted under 35 U.S.C. 154(b) by 20 days.

(21) Appl. No.: 12/410,766

(22) Filed: Mar. 25, 2009

(65) Prior Publication Data

US 2010/0248516 A1 Sep. 30, 2010

(51) Int. Cl.
*H01R 13/52* (2006.01)
(52) U.S. Cl. ..................................................... 439/271
(58) Field of Classification Search ................. 439/784, 439/587, 274, 349, 805
See application file for complete search history.

(56) References Cited

U.S. PATENT DOCUMENTS

| | | | |
|---|---|---|---|
| 4,021,092 A * | 5/1977 | Ericson, Jr. ................. | 439/472 |
| 6,957,970 B2 * | 10/2005 | Weigel et al. ............... | 439/320 |
| 7,014,513 B2 * | 3/2006 | Tomasino .................... | 439/784 |
| 7,040,916 B2 * | 5/2006 | Schmidt et al. ............. | 439/460 |
| 7,153,161 B2 * | 12/2006 | Huang ......................... | 439/583 |
| 2008/0171466 A1 * | 7/2008 | Buck et al. .................. | 439/578 |

* cited by examiner

*Primary Examiner*—Chandrika Prasad
(74) *Attorney, Agent, or Firm*—Peninsula IP Group; Douglas Chaikin

(57) ABSTRACT

Disclosed herein is an electrical connector for use with an underwater electrical device. The underwater electrical device is connected to a source, such as a power source, by electrical wiring. The connector is adapted for connecting the source and the underwater electrical device without compromising the integrity of the electrical connection despite expected movement and considerable torsional forces being exerted upon the connection so made. In an exemplary embodiment, the electrical device includes internal screw threads. The connector includes an insertion member for retaining the electrical wiring. The insertion member is elastic and deformable. The connector further includes a clamping member having an external screw for compatible engagement of the electrical device internal screw threads. Finally, the connector includes a sealing member for creating a leak proof seal between the connector and the electrical device. The insertion, sealing and clamping members are sized and shaped for compression upon the full engagement of the screw threads of the respective elements, thereby providing a leak proof seal.

20 Claims, 4 Drawing Sheets

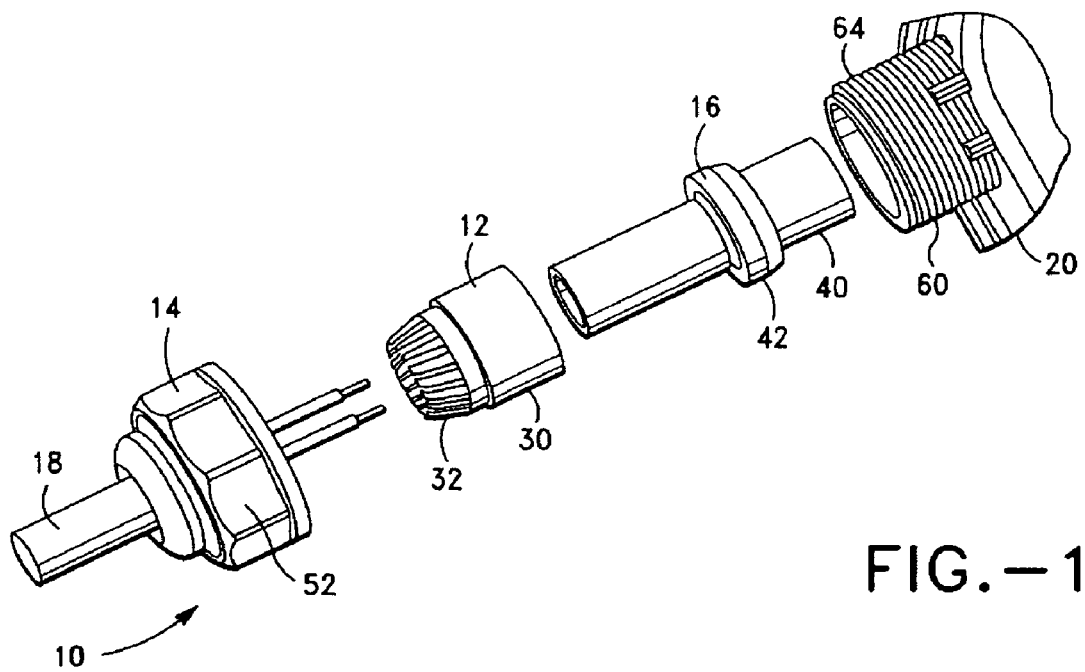
FIG.-1
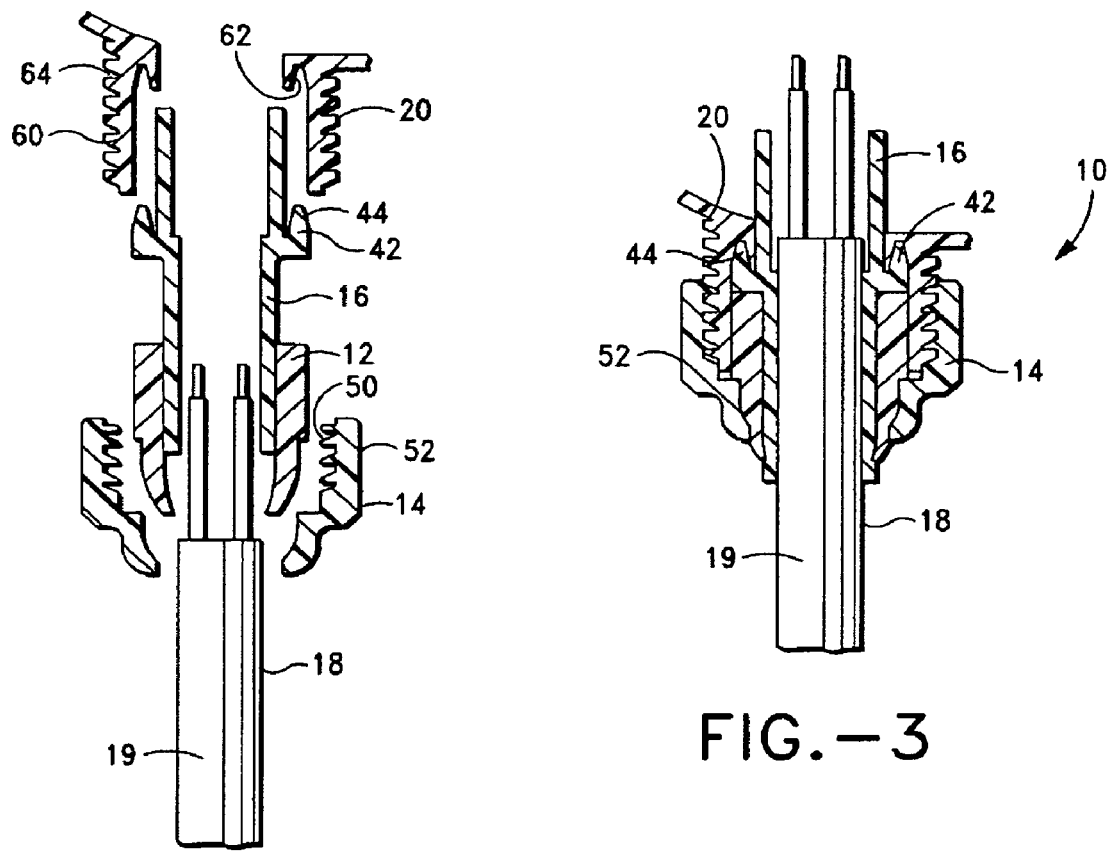
FIG.-2
FIG.-3

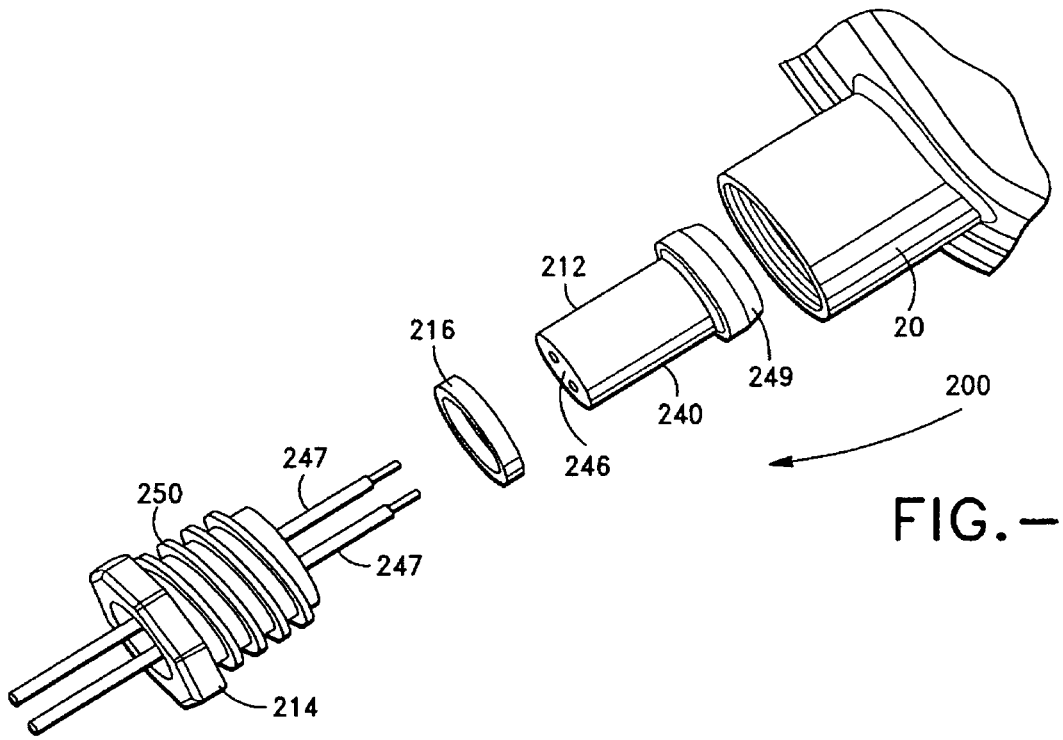
FIG.-6
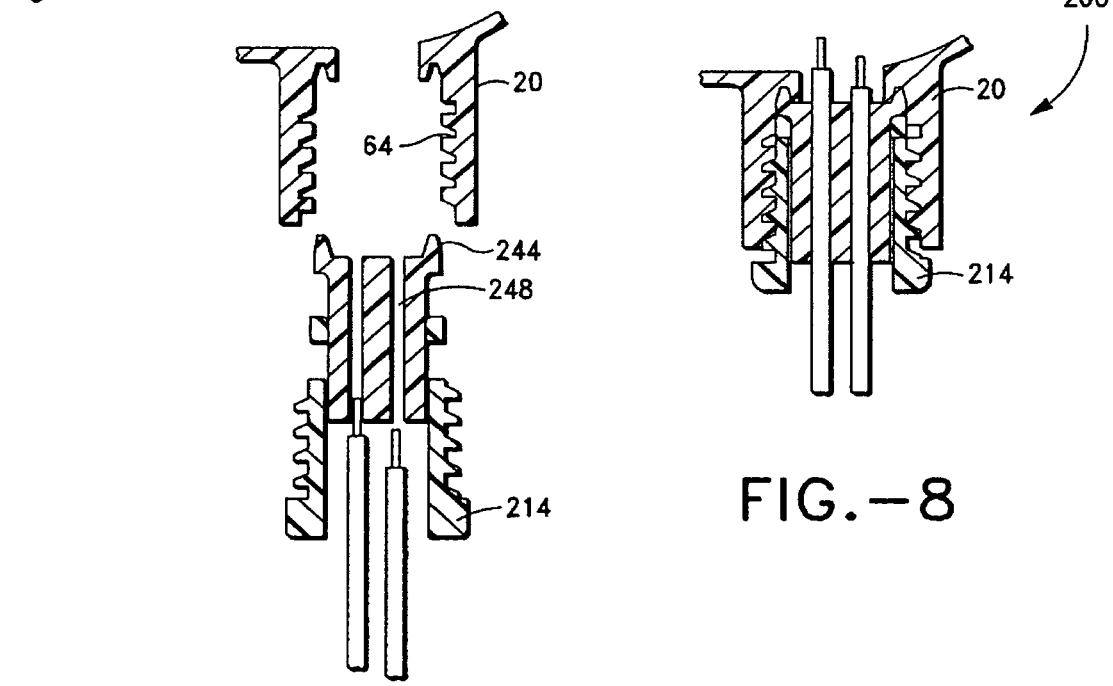
FIG.-7
FIG.-8

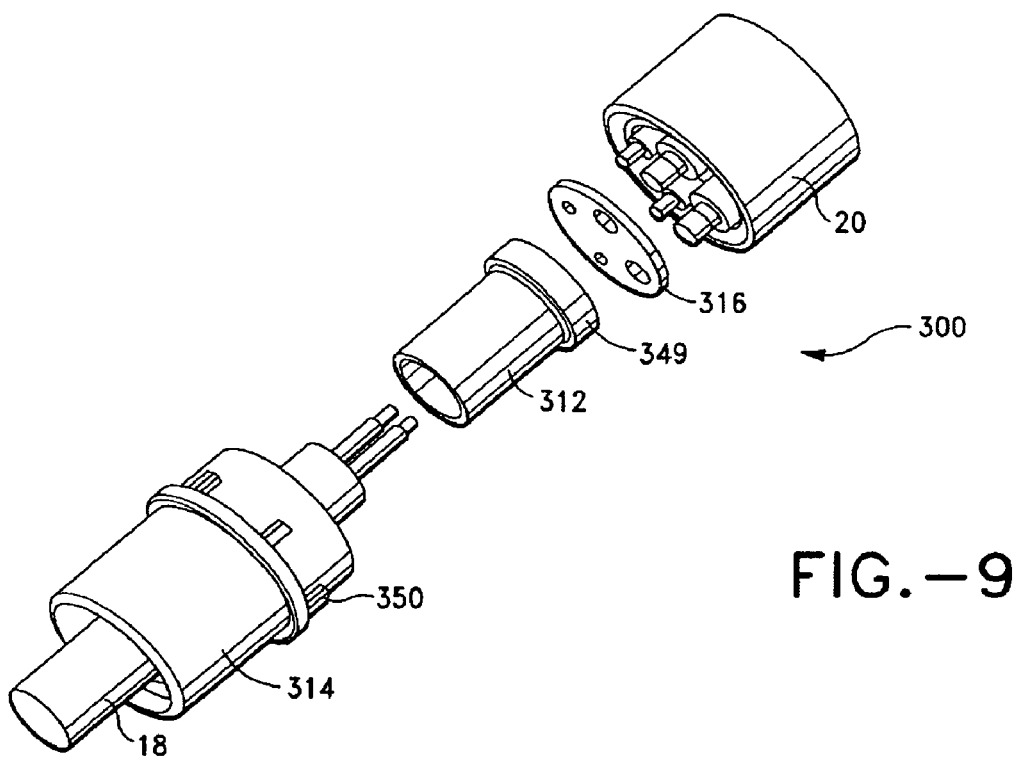
FIG.-9
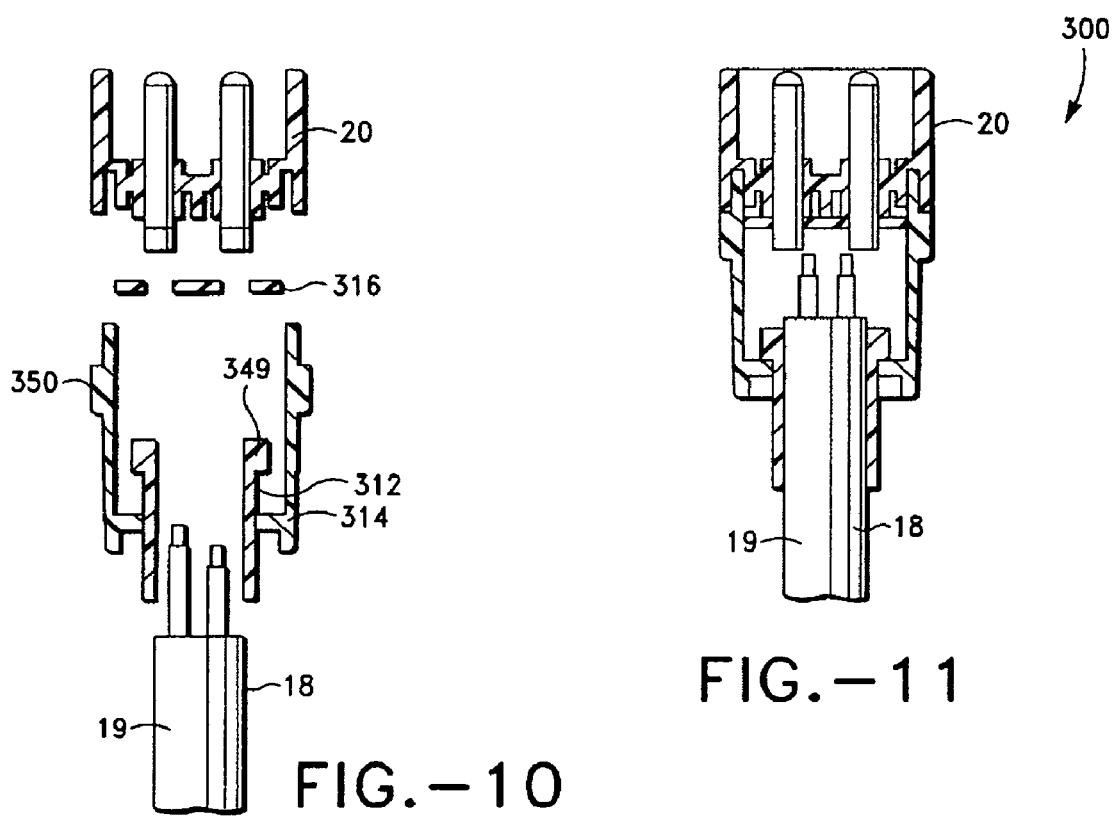
FIG.-10
FIG.-11

UNDERWATER CONNECTOR WITH A DEFORMABLE INSERTION MEMBER AND A SEALING MEMBER SQUEEZED BY A CLAMPING MEMBER

FIELD OF THE INVENTION

This invention generally relates to the field of connectors for electrical devices and particularly those devices suitable for use in an aquatic environment. And, more particularly, this invention relates to hermetically sealed connectors, which are used for electrical devices designed to move and encounter various torsional forces, while performing its intended function.

BACKGROUND OF THE INVENTION

An electrical device or an electro-mechanical device that is used for underwater work, such as a pool cleaner, typically includes an electrical motor which needs to receive power from a source through an electrical cable such as an electrical power cord. Of course, other electrical cords or wiring are necessary for various function. Electrical cords are needed for underwater sonar, scrubber diver's electrical appliances, including flash light attachments and underwater cameras Thus, electrical wiring will connect the electrical device with a source outside the aquatic environment. Such electrical wiring may be of small or large diameter cable. These, cables, especially the larger cables, exert torque and torsional forces on the points of connection between the electrical wiring and the electrical device.

In the case of a pool cleaner, the electrical device, the pool cleaner, is continuously in motion. Additionally, an electrical device, such as a pool cleaner, in addition to constant motion is also twisting, turning, and even becoming upside down at time.

Each twist and turn of the electrical device places an added stress burden upon the mechanical connection between the electrical wiring and the electrical device. In a normal atmospheric environment, such twist and turns might not be critically important. However, in a submersible or underwater environment, the integrity of the connection between the electrical wiring and the electrical device is critical. If such a connection is disrupted while the electrical device is submerged, water can leak into the connector and destroy the electrical connection as well as both the device and the electrical wiring. In fact, such destruction may well include shorting out the connection between the source and the electrical device and potentially resulting in damage and even destruction of the source.

Clearly, the longevity of all of the elements of the circuit are affected by the electrical connection. The electrical device and the source and the electrical wiring all rely upon a stable flow of electrical current in order to operate at their maximum efficiency as well as to maximize their life's cycle. As can be imagined, it is critically important to prevent the even the slightest break in the integrity of the connection in such a hostile environment.

Conventional connectors rely upon the mating of a nut and the screw thread of the electrical device. Improved such conventional devices occasionally include an elastic component, such as a sleeve. Such sleeves have a habit of shrinking during use or depending upon the temperature of the environment. For example, in cooler weather, certain elastic material will have a tendency to shrink substantially. This could affect the integrity of the leak proof seal for which the sleeve is used.

In other cases, the repeated expansion and contraction of the sleeve as a result of being exposed to very warm air and cool water temperatures can have an effect on the elasticity of the sleeve. During repeated contractions, especially at extreme temperatures, the sleeve will lose, at least some of its elastic qualities. Once sufficient loss of elasticity is present, leak paths are more likely to develop causing the damage as recited above.

It will be appreciated that such connectors are not limited to an aquatic environment. A connector providing leak proof or hermetic seal is useful in a variety of environments, including for example, outer space, ultra clean room environment and in pressurized sub-micron size particle processing.

What is needed is a leak proof connector which provides extended longevity and maximum integrity for each connection. ed from the pool without an undue burden on its user.

SUMMARY OF THE INVENTION

The structure, in accordance with the present invention, is a leak proof connector having an outer clamping member, which engages the electrical device, typically by screw threads on each of the clamping member and the electrical device. The connector includes at least one internal member defining a sleeve capable of retaining the electrical wiring. Another internal member, a sealing member is either integral with the sleeve or a separate member altogether. Electrical wiring for connecting the source and the electrical device is threaded through the sleeve and clamping members. Upon complete engagement of the clamping member onto the electrical device, the sleeve compress unto the electrical wiring and the sealing member compresses between the connector and electrical device providing a leak proof seal from the source to the electrical device.

In accordance with the objects set forth above and as will be described more fully below, the leak proof connector in accordance with this invention, comprises:

an insertion member for retaining the electrical wiring, the insert member being elastic and deformable;

a clamping member for compressing the insert member; and a sealing member for sealing the connector to the electrical device, whereby upon the electrical wiring being inserted and retained by the insertion member, the clamping member squeezes the member minimizing the amount of air between the insertion member and the electrical wiring and upon squeezing the insertion member, the sealing member forms a leak proof connection between the electrical device and the connector.

In another embodiment of the leak proof connector in accordance with this invention is used to electrically connect an underwater electrical device with a source through electrical wiring. The connector in accordance with this invention is adapted for connecting the source and the underwater electrical device without compromising the integrity of the electrical connection despite movement of the electrical device and the electrical device having an internal screw thread, the connector comprising an insertion member for retaining the electrical wiring, the insert member being elastic and deformable;

a clamping member having an external screw for compatible engagement of the electrical device external screw compatible with the electrical device external screw, a sealing member for sealing the connector to the electrical device; and the insertion, sealing member and clamping member sized and shaped for compression upon the full engagement of the external screw threads of the clamping member and the electrical device, providing a leak proof connection between the source and the electrical device for the electrical wiring.

In still another exemplary embodiment of the leak proof connector in accordance with this invention, the leak proof seal comprises a hermetic seal.

Thus, it is an object of this invention is to provide a leak proof connector which continues to provide such a leak proof seal despite the electrical device moving about and encountering various twists and turns of the electrical device, which exert various torsional forces on the connector and connections.

It is another object of this invention to provide such a leak proof connector which functions using mechanical structure and without the aide of adhesive.

It is an additional object of this invention to provide such a leak proof connector which can be adapted for bare wire electrical wiring or for insulated cable.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein:

FIG. 1 is a perspective view of the first embodiment of the leak proof connector in accordance with this invention.

FIG. 2 is an exploded plan view of the leak proof connector in accordance with this invention of FIG. 1

FIG. 3 is an assembled view the exemplary embodiment of FIG. 1 of the leak proof connector in accordance with this invention.

FIGS. 6-8 are perspective, exploded and assembled views, respectively, of another exemplary embodiment of the leak proof connector in accordance with this invention.

FIGS. 9-11 are perspective, exploded and assembled views, respectively, of another exemplary embodiment of the leak proof connector in accordance with this invention.

DETAILED DESCRIPTION OF THE INVENTION

Figure 4:
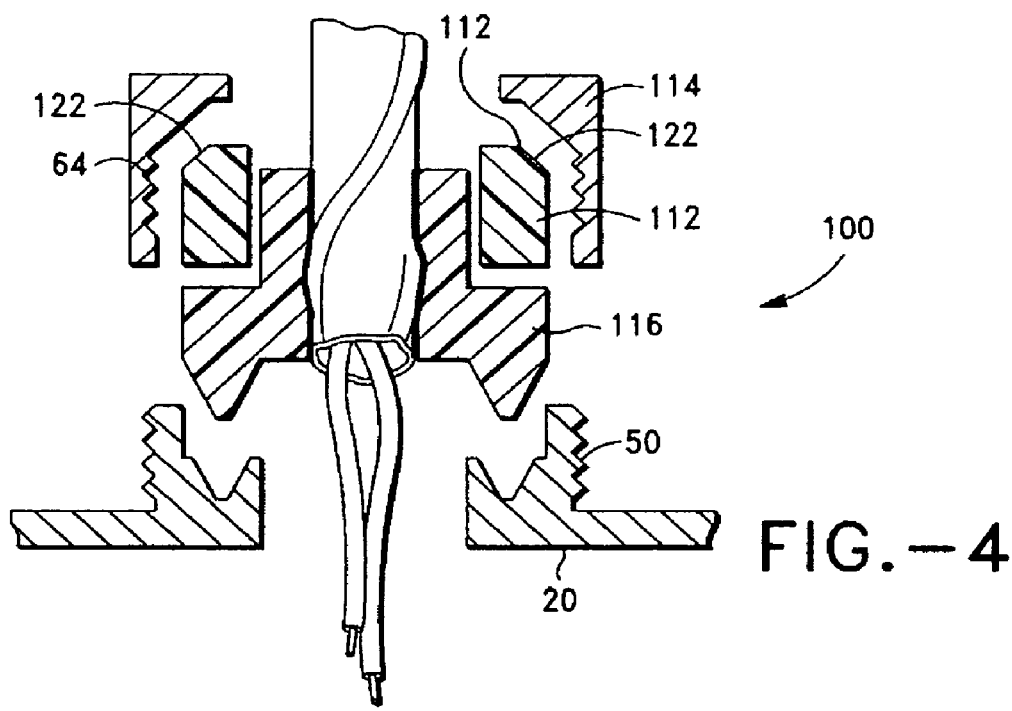
FIGS. 4 & 5 are exploded and assembled views, respectively, of another exemplary embodiment of the leak proof connector in accordance with this invention.

In order to appreciate the invention herein, one must appreciate the need in the art as set forth in the Background. Most importantly, the structure herein for creating the connector provides a mechanical device, which creates a leak proof seal between the source and the electrical device, which is connected to the source through electrical wiring. This leak proof seal's integrity is maintained while the electrical device performs its work. For example, in the case where the electrical device comprises a pool cleaning vehicle. As the vehicle cleans the pool, the vehicle must go through various twists and turns. These movements create torsion force and torque upon the connector and the connections described above. Regardless of these forces, the integrity of the seal must be maintained as well as the electrical connections.

An exemplary embodiment of the electrical connector in accordance with this invention, generally designated by the numeral 10, includes an insertion member 12, a clamping member 14 and sealing member 16. An electrical cord or wiring 18 is threaded through elements 14, 12 and 16, respectively and connects an electrical device 20 with a source (not shown), such as a power source. In such a case, where the source is a power source, the electrical wiring defines a power cord.

In the exemplary embodiment of FIGS. 1-3, the insertion member 12 includes a cylindrical sleeve 30 and a plurality of fingers 32 extending from the sleeve 30. The insertion member is elastic and compressible. Additionally, as the fingers compress they define a claw-like structure, which grabs and compresses the sealing member 16, thereby compressing the electrical wiring 18 and holding the wiring in place.

The electrical wiring 18 is inserted into the sealing member 16. The sealing member 16 comprises an elongated sleeve 40 having an O-ring portion 42 centrally located on the sleeve. As with the insertion member 12, the sealing member is also elastic and compressible. As the insertion member 12 compresses, the elongated sleeve 40 is likewise compressed. And, as described above, as the sleeve 40 compresses, the electrical wire 18 is grabbed and held in place.

The O-ring portion 42 will be described below. But as can be appreciated as the sleeve is compressed, the O-ring portion 42 fits into place as shown in FIGS. 2 and 3 below.

The clamping member 14 defines a collar and fits over the insertion member 12 and sealing member 16. As noted above the electrical wire 18 is thread through the clamping member 14. The clamping member 14 includes internal threads 50 and a nut-like external surface 52. As shown in FIGS. 1-3, the electrical device 20 includes external threads 60. The internal threads 50 of the clamping member 14 mate compatibly with the external threads 60 of the electrical device 20.

As the clamping member 14 is threaded unto the electrical device 20 through threads 50 and 60, the elastic members 12 and 16 are compressed. The claw of the insertion member 12 press against the elongated sleeve 40, which in turn press against the electrical wiring 18. As the clamping member 14 completes its threading against the electrical device 20, additional compression occurs. Finally, upon completion of the threading of the clamping member 14 against the electrical device 20, the fit of the electrical wiring 18 within the connector 10 becomes secure.

It will be seen especially in FIGS. 2 & 3 that the O-ring portion 42 is squeezed between the insertion member 12 and the electrical device 20 and bounded by the elongated sleeve 40. This provides a leak proof connection without the aide of glue or adhesives of any kind.

In the exemplary embodiment of FIGS. 1-3, the electrical device is provided with a groove 62 and the O-ring portion has an overlapping tongue 44. The tongue 44 and groove 62 are designed for compatible mating engagement. As the elements of the connector are compressed, a hermetic seal is created as the tongue 44 and groove 62 compress against each other.

Each of the elastic elements of the connector 10 are made from a polymeric material. The polymeric material is not only elastic, but also compressible and forms a water tight seal with sufficient compression.

Figure 5:
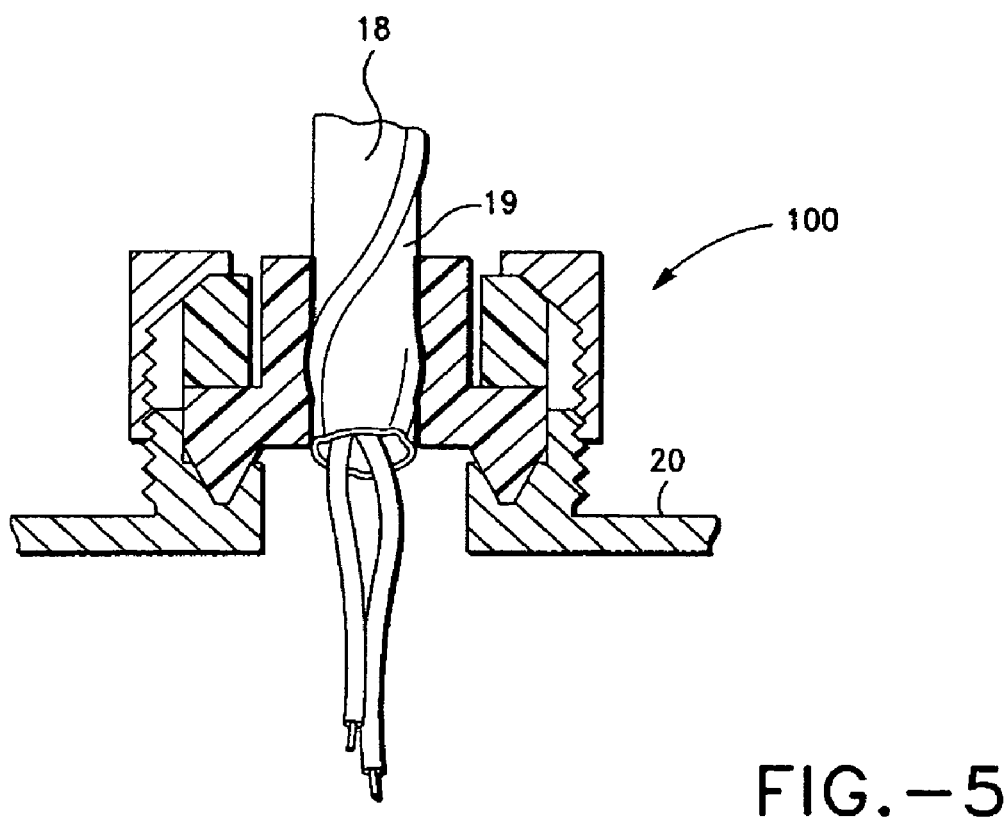

With respect to FIGS. 4 & 5, there is shown another embodiment of the connector in accordance with the invention generally designated by the numeral 100. As with the earlier described embodiment with respect to FIGS. 1-3, the instant embodiment includes a clamping member 114, an insertion member 112 and a sealing member 116.

In this embodiment, the insertion member 112 has a notch 122 which seats matingly on the inside of the clamping member 114, as shown. This further aides in the gripping and holding of the electrical wiring and consequently, providing a hermetic seal for the connector.

With respect to FIGS. 6-8 there is shown another exemplary embodiment of the connector in accordance with the invention generally designated by the numeral 200. As with the earlier described embodiment with respect to FIGS. 1-3, the instant embodiment includes a clamping member 214, an insertion member 212 and a sealing member 216.

In this embodiment, the clamping member 214 has external threads 250 which mate compatibly with the internal threads of the electrical device 64. A nut-like outer surface 252 is provided on the clamping member, similar to the outer surface 52 shown in FIGS. 1-3.

The sealing member 216 in this embodiment comprises an O-ring. The O-ring is made a from a deformable, elastic material and functions in a way similar to such articles.

The Insertion member 212 defines a plug. The plug comprises an elongated sleeve 240 with a center 246 adapted for receiving the electrical wiring 18. In this embodiment, the electrical wiring 18 is a plurality of wires broken from the wiring harness or bundle. The single wires 247 are inserted through openings 248. The openings 248 are sized and shaped for snug, but slidable engagement with the wires 247.

The insertion member 212 has a blunt end 249. The blunt end 249 abuts into the electrical device 20 as shown in FIGS. 6-8. Also as described earlier with respect to FIGS. 1-3, the blunt end has a tongue 244 which mates compatibly with the electrical device groove 62. Also, similar to the insertion member of FIGS. 1-3, the insertion member 212 is elastic and deformable and made from a polymeric material.

The wires 247 are thread through the clamping member 214 and inside the O-ring 216 and inserted and slide through the plug openings 248. The wires 247 are stripped bare and the electrical connection to the electrical device 20 is then made in the conventional manner.

As the clamping member 214 is screwed tight against the internal threads 64 of the electrical device, the clamping member sends a compressive force through the insertion member 212 compressing the insertion member 212 and as described above, gripping and holding the electrical wiring 18 in place. Additionally the openings 248 are compressed causing a tight mating fit of the wires 247 with the plug. The tight mating fit of the wires 247 with the plug provides a blockage against any leak path that could develop during a catastrophic event.

Additionally, as the clamping member 214 reaches its limit against the electrical device 20, the O-ring is compressed within the space formed by the elements of the connector 10 and as clearly illustrated in FIG. 8. Such compression along with the proper fit of the threads of the electrical device 20 and the clamping member 214 provide a hermetic seal.

Such a seal is not compromised as the electrical device moves or as various torsional forces and torques are applied to the connection and the connector 10. Thus, the connector 10 provides a simple and efficient means for creating a durable leak proof seal.

With respect to FIGS. 9-11, there is shown another exemplary embodiment, there is shown another exemplary embodiment of the connector in accordance with the invention generally designated by the numeral 300. As with the earlier described embodiment with respect to FIGS. 1-3, the instant embodiment includes a clamping member 314, an insertion member 312 and a sealing member 316.

In this embodiment, the electrical wire 18 has a flexible jacket 19. The clamping member 314 includes a series of external notches 350 which mate with internal notches on the electrical device 20. In order to lock the connector 300 against the electrical device, the connector 300 is inserted into the electrical device 20 as shown particularly in FIGS. 10 and 11 and the notches of each of the electrical device 20 and the clamping member 314 align and then are twisted and locked into place. As a result of this twisting and locking force, a compressive force is sent through the clamping member 314 onto the insertion and sealing members, 312 and 316, respectively. The clamping member 314 surrounds the electrical wiring 18 and the insertion and sealing members, 312 and 316, respectively.

In an exemplary embodiment, the sealing members 312 and 316 having a higher durometer than the flexible covering 19. This provides a greater amount of friction and resists slippage and torsional forces. This is especially useful where such flexible outer coverings over the electrical wire 18 are used.

Similar to the embodiment described above with respect to FIGS. 6-8, the insertion member has a blunt end 349. In this case, the blunt end 349 pins the sealing member 316 in place and creates a leak proof seal upon the locking of the clamping member 314 to the electrical device 20. The sealing member is compressed between the notches of each of the clamping member 314 and the electrical device 20. This creates a leak proof seal, which in combination with the other aspects of the connector 300 provides a hermetic seal between the source and the electrical device 20.

The sealing member 316 is a solid circle of polymeric material having a series of openings 368 to match the diameter size and even shape of the wires 247. It will be appreciated that the wires 247 may be stripped or unstripped and even may still be part of the electrical wiring bundle within the spirit and scope of this embodiment. The sealing member is readily adaptable to be customized in this embodiment for various wire types, various wire numbers and even a wire harness or bundle. Once assembled, the elements are potted to retain the flexible electrical wire 18.

While the foregoing detailed description has described several embodiments of the leak proof electrical connector in accordance with this invention, it is to be understood that the above description is illustrative only and not limiting of the disclosed invention. While it is antithetical to the concept of the connector in accordance with this invention to use adhesive or glue to either create or seal the connection, it is within the spirit and scope to use such means as an additional means to create a leak proof or hermetic seal. For example in the embodiment where there are narrow openings in the sealing member, that member may be filled with such adhesive prior to full connection of the connector. Thus, prior to a full screw connection in those embodiments having a threaded means for complete assembly and in the latching embodiment, prior to finally twisting, adhesive may be added to the connector and the final connection made prior to the setting the glue or adhesive. It is to be emphasized that while this may give the user added confidence in the connection, the mechanical connection alone is sufficient to create the leak proof connection of the instant invention. Consequently, merely, adding adhesive to the already existing elements does not render a device outside the spirit or scope of the invention. Thus, the invention is to be limited only by the claims as set forth below.

What is claimed is:

1. An electrical connector for use with an underwater electrical device, the underwater electrical device being connected to a source by electrical wiring, the connector adapted for connecting the source and the underwater electrical device without compromising the integrity of the electrical connection, the connector comprising:

an insertion member for retaining the electrical wiring, the insertion member being elastic and deformable;

a clamping member for compressing the insert member; and a sealing member for sealing the connector to the electrical device, whereby upon the electrical wiring being inserted and retained by the insertion member, the clamping member squeezes the insertion member minimizing the amount of air between the insertion member and the electrical wiring and upon squeezing the insertion member, the sealing member forms a leak proof connection between the electrical device and the connector.

2. The connector as set forth in claim 1, wherein the seal between the electrical device and the connector defines a hermetic seal.

3. The connector as set forth in claim 1, wherein the clamping member defines a collar and the insertion member has a plurality of extended fingers.

4. The connector as set forth in claim 3, wherein the extended fingers define a claw and the claw exerts an increased grip and pressure upon the electrical wiring.

5. The connector as set forth in claim 4, wherein the connector includes an additional plug member.

6. The connector as set forth in claim 4, wherein the sealing member defines a plug member.

7. The connector as set forth in claim 6, wherein the plug member includes a sleeve and the sealing member has a sealing portion located approximately midway on the sleeve.

8. The connector as set forth in claim 7, wherein the plug surrounds and captures the electrical wiring, the insertion member surrounds and captures the plug and electrical wiring, the collar surrounds and connects to the electrical device, whereby upon complete threaded engagement of the collar with the electrical device, the electrical wiring is connected with a leak proof connection from the source to the electrical device.

9. The connector as set forth in claim 1, wherein prior to the final connection adhesive is applied to the sealing member.

10. The connector as set forth in claim 9, wherein complete connection of the clamping member is made prior to setting of the adhesive.

11. The connector as set forth in claim 1, wherein the connector includes internal members, namely the sealing and insertion members and wherein the internal members are made from. polymeric material.

12. An electrical connector for use with an underwater electrical device, the underwater electrical device being connected to a source by electrical wiring, the connector adapted for connecting the source and the underwater electrical device without compromising the integrity of the electrical connection, the electrical device having an internal screw threads, the connector comprising:

an insertion member for retaining the electrical wiring, the insertion member being elastic and deformable;

a clamping member having an external screw for compatible engagement of the electrical device internal screw threads, a sealing member for sealing the connector to the electrical device, the sealing member being elastic and deformable; and the sealing and insertion members being sized and shaped for compression by the clamping member upon the full engagement of the screw threads, thus, providing a leak proof connection between the source and the electrical device for the electrical wiring.

13. The connector as set forth in claim 12, wherein the seal between the electrical device and the connector defines a hermetic seal.

14. The connector as set forth in claim 13, wherein the sealing member comprises an O-ring.

15. The connector as set forth in claim 12, wherein the sealing member includes a tongue and where the electrical device is specifically adapted to include a mating and compatible groove.

16. The connector as set forth in claim 12, wherein the electrical device includes a series of notches and wherein the clamping member includes a series of compatible mating notches whereupon twisting causes the notches to lock one against the other such that interlocking connection is made and such that a compression force is exerted against the other elements of the connector causing electrical inserted within the device to be grip and held in place by the insertion member and wherein a compressive force is applied to the sealing and insertion members upon complete connection of the connector.

17. The connector as set forth in claim 12, wherein prior to the final connection adhesive is applied to the sealing member.

18. The connector as set forth in claim 17, wherein complete connection of the clamping member is made prior to setting of the adhesive.

19. An electrical connector for use with an underwater electrical device, the underwater electrical device being connected to a source by electrical wiring, the electrical wiring having a flexible outer covering, the connector adapted for connecting the source and the underwater electrical device without compromising the integrity of the electrical connection, the connector comprising:

an insertion member for retaining the electrical wiring, the insertion member being elastic and deformable;

a clamping member for compressing the insert member; and a sealing member for sealing the connector to the electrical device, the clamping and sealing members being potted together to retain the flexible outer covering of the wiring, whereby upon the electrical wiring being inserted and retained by the insertion member, the clamping member squeezes the insertion member minimizing the amount of air between the insertion member and the electrical wiring and upon squeezing the insertion member, the sealing member forms a leak proof connection between the electrical device and the connector.

20. The connector as set forth in claim 19, wherein the clamping member is made from a polymeric material and wherein that polymeric material has a higher durometer than the flexible covering of the electrical wiring.

* * * * *